(12) United States Patent
Mathews et al.

(10) Patent No.: US 6,726,172 B2
(45) Date of Patent: Apr. 27, 2004

(54) VALVE

(75) Inventors: Hans F. Mathews, Plantation, FL (US); Jerry Racaniello, Boca Raton, FL (US); Dustin A. Malicke, Pompano Beach, FL (US); Peter Steinrück, Hallstatt (AT)

(73) Assignee: Hoerber Kompressortechnik Services GmbH, Vienna (AU)

( * ) Notice: Subject to any disclaimer, the term of this patent is extended or adjusted under 35 U.S.C. 154(b) by 41 days.

(21) Appl. No.: 10/214,705

(22) Filed: Aug. 9, 2002

(65) Prior Publication Data

US 2004/0026639 A1 Feb. 12, 2004

(51) Int. Cl.$^7$ .......................... F16K 31/06; F02M 25/00
(52) U.S. Cl. ................ 251/30.02; 123/446; 251/129.07
(58) Field of Search .................... 251/30.01–30.05, 251/62, 63, 129.07; 123/446

(56) References Cited

U.S. PATENT DOCUMENTS

| | | | | |
|---|---|---|---|---|
| 5,377,636 A | * | 1/1995 | Rix et al. | 123/446 |
| 5,460,133 A | * | 10/1995 | Perr et al. | 123/446 |
| 6,454,238 B1 | * | 9/2002 | Steinruck | 251/30.01 |
| 6,530,556 B1 | * | 3/2003 | Boecking | 251/129.01 |

FOREIGN PATENT DOCUMENTS

| | | |
|---|---|---|
| EP | 0425327 | 5/1994 |
| JP | 58128588 | 8/1983 |

* cited by examiner

Primary Examiner—Paul J. Hirsch
(74) Attorney, Agent, or Firm—Dykema Gossett PLLC

(57) ABSTRACT

A valve for bringing gaseous fuel into the combustion chamber of gas engines is provided with a solenoid valve (8) controlling fuel delivery (7) and an adjoining poppet valve (2), which closes biased by the force of a spring, and which opens in the direction of the combustion chamber through the pressure of in-flowing gas. For the purpose of keeping the poppet valve (2) open, independent from the pressure conditions at its valve head (3), the valve's stem (4) is connected to a step piston (6) whose topside and bottom side are biased by the fuel pressure existing between the solenoid valve (8) and the valve head (3) and whose step area (12) is in communication with the fuel delivery line (7), on one side, and with the space (11) between the step piston (6) and the valve head (3), on the other side, whereby the passageways (15, 15', 17, 17') are opened and closed by means of a respective switching member (13, 14, 20) corresponding to the movement of the step piston (6). The poppet valve (2) is thereby kept in a closed position, assisted by pressure, after the end of the gaseous fuel injection.

6 Claims, 3 Drawing Sheets

VALVE

BACKGROUND OF THE INVENTION

1. Field of the Invention

The invention relates to a valve for bringing gaseous fuel into the combustion chamber of gas engines including a solenoid valve controlling the fuel supply and an adjoining check valve designed as a poppet valve (disk valve), which is closed by the force of a spring and which opens in the direction of the combustion chamber through the pressure of gas flowing from the opened solenoid valve.

2. The Prior Art

Valves of this type are known from JP 58-128 588 or EP 0 425 327 B1, for example, which make possible direct metering of gaseous fuels into the combustion chamber of reciprocating engines. The pressurized gaseous fuel is guided through the electrically controlled solenoid valve to the check valve, which is closed by the force of a spring, designed as a poppet valve, and disposed on the side of combustion chamber. The check valve is subsequently opened through the existing gas pressure after overcoming the closing force of the spring. After closing of the solenoid valve, the gas located in the space between the solenoid valve and the poppet valve escapes further into the combustion chamber until the closing force of the pull-back spring of the poppet valve becomes effective again against the decreasing gas pressure and it thereby closes the poppet valve.

In the disclosed arrangements with its described simple concept it has been shown—especially from examination of the combustion exhaust fumes—that under some operational conditions undesirably high emissions of unburned hydrocarbon occur that originate obviously from the fuel that reaches the combustion chamber even after the completion of the actual combustion process.

To avoid these disadvantages, there is according to an earlier invention (see U.S. patent application Ser. No. 09/876 030) the closing element of the poppet valve connected to a step piston on the side that faces away from the valve head (disk) whereby the step piston's larger upper side facing away from the head and the opposite smaller lower side are biased by the fuel pressure existing in the space located between the solenoid valve and the valve head, and whereby the step piston's step area corresponds to the difference in diameter between the two step piston areas, is influenced by an essentially constant pressure, and whereby the step area of the step piston is significantly larger than the actuation space of the check valve that remains between the stem and the seat area of the valve head. Thereby there is determined the force balance (the spring force and the gas pressure at both sides) effecting the poppet valve at first only through the spring force and the pressure differential on the step piston. The pressure forces, which naturally engage the substantially smaller valve head like before and thereby also the above-mentioned influence of the pressure reduction caused by the flow, are now of secondary significance whereby a sufficiently large closing force surplus may be ensured without difficulties and re-opening of the poppet valve is strictly prevented at the end of the working stroke under the described conditions.

With this earlier design, the fact was taken into consideration that the possibly largest surplus in closing force must exist toward the end of the closing phase of the check valve on the side of the combustion chamber so that the re-opening of the valve is prevented with certainty after the completed combustion. For the achievement of this object, there is additionally the difficulty that during the flow of the gaseous fuel around the disk head, a pressure develops that lies below the static pressure of the otherwise local pressure in the space. The local pressure is caused on the side facing the stem through the high flow velocity of the gaseous fuel, which lies in order of magnitude at the speed of sound whereby the force balance initiating the closing movement is reached only at a higher pressure differential between the first space and the working chamber compared to the transferred closing force of the spring of the disk valve onto the pressure-biased surface of the poppet valve. The surplus of closing force at the end of the closing phase of the disk valve is thus significantly reduced. It is thereby practically impossible to avoid under all circumstances the re-opening of the disk valve at the end of the working stroke simply by suitable balancing structural conditions of the known valve.

It has been shown in various specific designs and operational conditions of the valve in a previous application that, under certain circumstances, fuel may obviously still enter the combustion chamber even after completion of the actual combustion process. An effort has been made to achieve the stated object in a better and more reliable way to avoid these disadvantages.

SUMMARY OF THE INVENTION

This is achieved according to the present invention in that the first space defined by the step area on the step piston is connected via a passageway to the fuel supply line, on one hand, and to the second space between the step piston and the valve head, on the other hand, whereby these passageways are selectively opened and closed according to the movement of the step piston by a respective switching member.

In this simply way, it can be achieved that the step piston—and thereby the poppet valve—is kept in a closed position by an assisting pressure after completion of the injection of fuel into the combustion chamber whereby the corresponding assisting pressure is controlled by the step piston itself at the start of the next opening movement of the step piston. The assisting pressure in the first space underneath the step piston is released and then it is again directly made available for [continued] operation without additional arrangements. The respective switching times for opening and closing of said passageways, leading to or away from the first space defined by the step area on the step piston, may be determined or varied very simple through mutual positioning of the corresponding members so that the design of the valve may be simply adjusted to the respective requirement.

In an additional embodiment of the invention it is proposed that the first switching member on the passageway between the fuel supply line and the step area and the step piston is provided with a sealing member at the larger circumference of said step piston whereby said sealing member opens or closes the piston-side opening of this passage according to the movement of the step piston, and whereby the delivery of the pressurized gaseous fuel is actively guided to the first space defined by the step area of the step piston. In addition, the alternative opening and closing of the fuel delivery could also be achieved through constructive influence of flow resistance in the path of the gaseous fuel from the delivery side to the outlet side in the direction of the second space between the step piston and the valve disk since a sufficiently large flow resistance the same effect as the actual active blocking and opening of the flow path during specific times of the dynamically occurring flow action.

According to an additional preferred embodiment of the invention, the switching member of the passageway between the first space defined by the step area on the step piston and the second space between the step piston and the valve head is provided with a sealing member at the smaller circumference of the step piston, which opens and closes an opening of the passageway arranged in the housing to the second space between the step piston and the valve head according to the movement of the step piston. As mentioned above, the pressurized gaseous fuel used to keep the valve head in a closed position is again guided thereby in an especially advantageous manner to the gaseous fuel flowing into the combustion chamber so that no other arrangements are necessary in this regard.

The required pressure conditions in the step area on the step piston may be very simply achieved through mutual positioning of the juxtaposed openings of the two passageways oriented in the direction of the movement of the step piston, or through mutual positioning of the respective control edges on the step piston.

The second switching member for the passageway, which leads from the first space defined by the step area on the step piston to the second space between the step piston and the valve head, may also be provided with a ring valve, according to another embodiment of the invention, which is arranged in the annular space defined by the step area on the step piston, whereby the ring valve is biased by a spring force against one end of bores in the step piston, whereby the bores form the passageway to the second space between the step piston and the valve head, and whereby the ring valve moves together with the step piston and opens the passageway when it abuts a stop member of the housing during the piston stroke. In this way there is provided an easy and variable control for opening and closing the passageway leading from the first space defined by the step area on the step piston to the second space between the step piston and the valve head, which makes possible the release of the holding pressure at beginning of the opening of the valve head.

According to another preferred embodiment of the invention, the delivery line to the first space defined by the space of the area on the step piston is permanently connected to the fuel supply line, which demands therefore an added structural requirement because of a separate delivery line that is independent from the solenoid valve but which always provides a sufficient pressure for fuel delivery to the step piston.

Moreover, the delivery line may also be connected via a check valve to the space between the solenoid valve and the larger upper side of the step piston, allowing a flow only in the direction to the step area, which is structurally very simple, but which requires the above-mentioned check valve and a sufficient capacity serving as a reservoir for reliable availability of sufficient pressure or capacity for a blocking effect in the step area.

In the following, the invention is explained in more detail with the aid of embodiment examples schematically illustrated in the drawings.

DETAILED DESCRIPTION OF THE PREFERRED EMBODIMENTS

Figure 1:
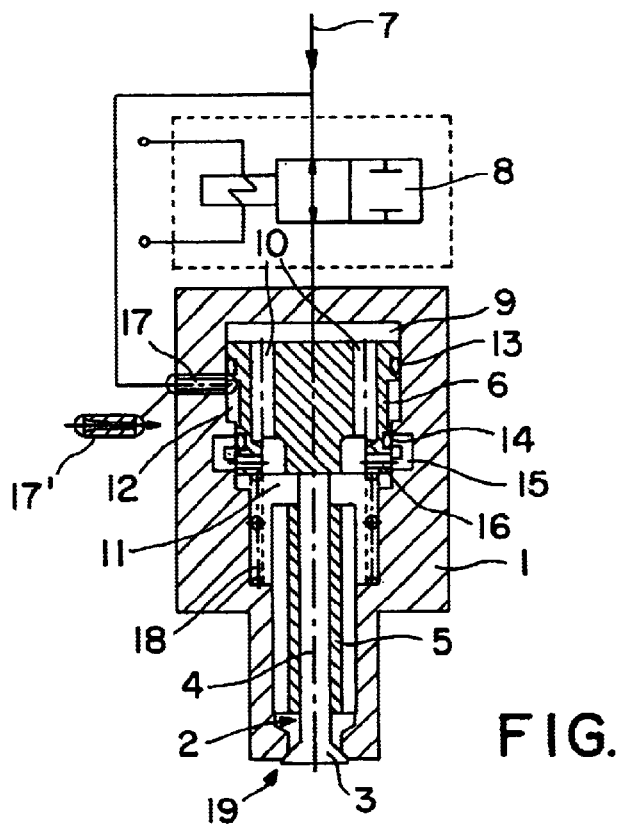
FIG. 1 shows thereby a schematic illustration of one embodiment example of the valve according to the invention.

The inventive valve in FIG. 1 consists essentially of a housing 1 having a poppet valve 2 arranged therein, which sealingly closes an opening in housing 1 with a valve head 3 that is at the bottom side of said housing 1 in the illustration. The stem 4 of the poppet valve 2 is guided axially in a bushing 5 and it is connected to the step piston 6 at the side facing away from the valve head 3 whereby the step piston 6 is in turn guided and sealed in a corresponding stepped bore of the housing 1.

On the topside of the housing 1, there is arranged a delivery line 7 for delivering pressurized gaseous fuel from the controlling solenoid valve 8, which allows in the illustrated position delivery from the delivery line 7 to a first space 9 disposed in the housing 1 above the larger circumference of the step piston 6. The first space 9 above the larger circumference of the step piston 6 is in communication via a connection bore 10 in the step piston 6 to the second space 11 between the underside of the step piston 6 and the valve head 3. The valve head 3 faces a combustion chamber of a combustion engine (not illustrated here) and it controls the injection of gaseous fuel into the same.

The step piston 6 defines a step area 12 between its upper larger diameter and the lower smaller diameter, which is separated by sealing members 13, 14 from the upper space 9 and the lower space 11.

The lower sealing member 14 is arranged in such a manner that it closes—in the illustrated closed position of the valve head 3—one (or several) passageway(s) 15 between the step area 12 and the lower space 11 (or the bores 16 leading thereto); in contrast, the upper sealing member (in the area of the larger diameter of the step piston 6) is arranged in such a way that it keeps open an additional passageway 17 between the step area 12 and the delivery line 7 (illustrated at the upper left area of the housing 1) in the closed position of the valve head 3 or the corresponding position of the step piston 6.

In the open position of the valve head 3 (not illustrated, but conceivable from FIG. 1), the passageway 15 is opened by the sealing member 14 and passageway 17 is closed by the sealing member 13 (details of their functioning are further explained below). According to the detailed drawing 17', the passageway 17 may be alternatively designed in the shape of a nozzle tapered toward the step area 12 whereby active closing of the passageway 17' may be omitted by using the sealing member 13 in a corresponding adaptation in its construction as long as delivery into the step area 12 is already controlled during the dynamic operation of the arrangement through the present flow resistors.

A closing spring 18 is additionally arranged in the space 12 underneath the step piston 6, which biases the poppet valve 2 in the closing direction of the valve head 3.

Functioning of the valve illustrated in FIG. 1 is described as follows:

The poppet valve 2 is found in the closed position as illustrated, which is caused by the closing spring 18 and the pressure biasing the step piston 6. The solenoid valve 8 is actuated in the illustrated open position for delivery of the metered fuel. The solenoid valve 8 allows thereby the flow of gas between the delivery line 7 and the upper space 9 whereby the gas pressure is also increased in the lower space via the connection bore 10. A pressure, corresponding to the pressure in the delivery line 7, had already developed previously in the step space 12. The pressure in the lower space 11 effects especially the upper side of the valve head 3 and it exerts thereby a force upon the poppet valve 2 in the opening direction. As soon as a force equilibrium has been reached or has been surpassed between the pressure biasing the step piston 6 and the closing force of the closing spring 18, then the step piston 6 and the poppet valve 2 begin to move into the opening direction.

During the opening movement of the step piston 6, the sealing member 13 passes the inner opening of the passageway 17 to the step area 12 and securely blocks thereby the delivery of pressurized gaseous fuel into the step area 12. Also during the opening movement of the step piston 6, the lower sealing member 14 opens the passageway 15 and opens thus the connection between the step area 12 and the lower space 11. The pressure in the step area 12 adjusts itself to the pressure in the lower space 11. The valve head 3 of the poppet valve 2 is kept open against the effects of the closing spring 18 through the drop in pressure via the annular exhaust nozzle 19 formed by the opening of the valve head 3. In addition, the developing pressure drop due to the flow in the connection bore 10 of the step piston increases the effect in the opening direction.

Should the solenoid valve 8 be closed at the end of the fuel injection, than the amount of gas stored in the space 6 and 11 continues to flow through the exhaust nozzle 19 into the combustion chamber whereby the gas pressure drops in the space 9 and 11 as well as in the step area 12, which is connected to said spaces via the opened passageways 15. The resulting effective total force is thereby reduced also in the opening direction. Should the pressure fall below a specific threshold value in the space 11 and in the spaces connected thereto, then the effect of the closing spring 18 is preponderant, whereby the closing movement of the poppet valve 2 is initiated.

The pressure continues to drop in the spaces 9 and 11 and in the step area 12 during the closing movement of the poppet valve 2. The pressure drop stops within the step area as soon as the passageway 15 is closed again by the sealing member 14.

The passageway 17 is again opened during the upward movement of the step piston 6 and the step area 12 is again biased by the pressure coming from the delivery line 7. The pressure increases thereby in the step area 12 and reinforces the closing force acting upon the step piston 6. The valve head 3 reaches the closing position and it is pulled into the seat by the closing spring 18 and by the pressure acting in the step area 12 whereby a sufficient closing force is guaranteed over the entire working cycle—and there is no longer possible the undesirable post-admission of fuel into the combustion chamber.

Figure 2:
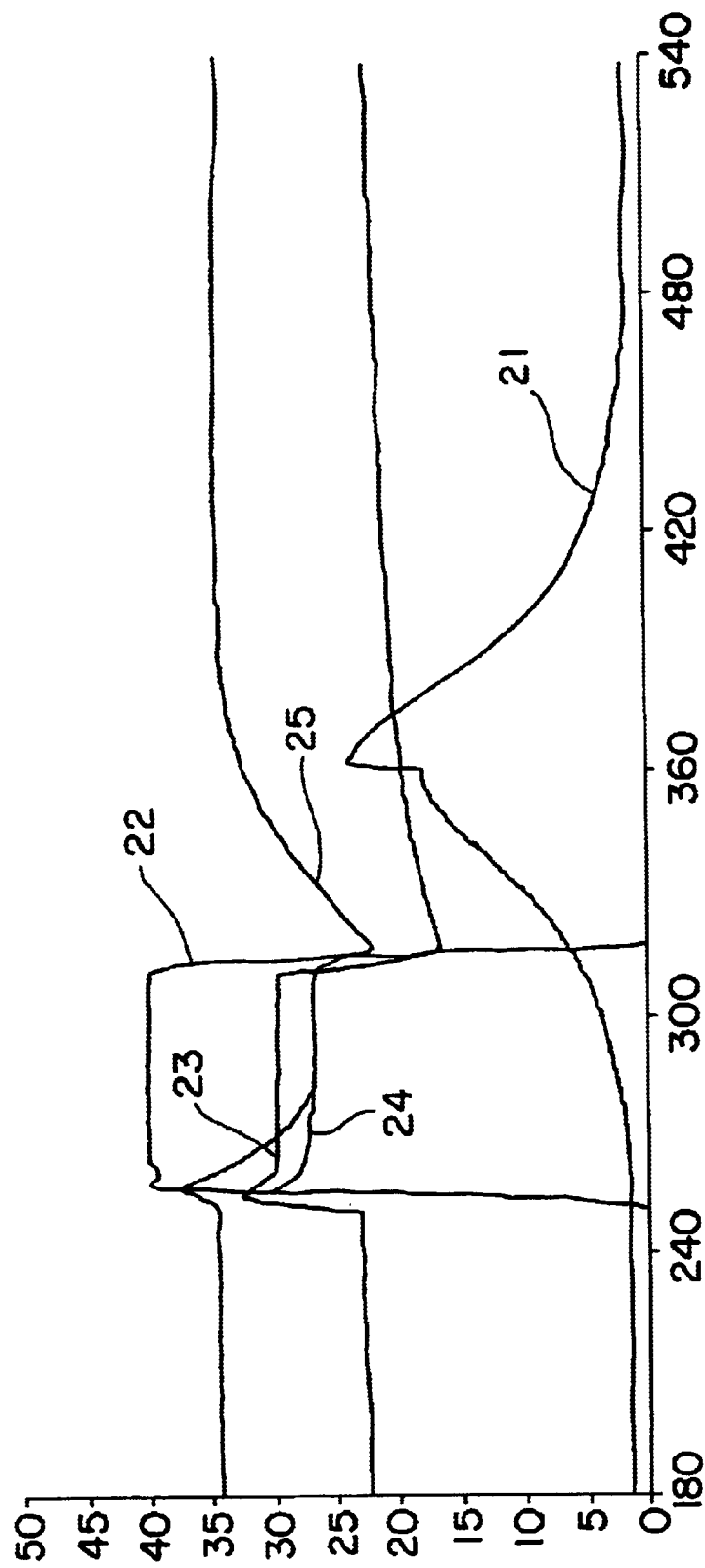
FIG. 2 shows the corresponding timely movement sequence of the poppet valve and the pressure during one working stroke of a combustion engine (not further illustrated) equipped with a valve according to FIG. 1.

FIG. 2 shows the above-described functioning of the movement of the poppet valve 2 and various pressures over the crank angle during a working stroke of the combustion engine (not further illustrated).

Curve 21 shows the course of pressure within the combustion cylinder; curve 22 shows the movement of the step piston 6 and the poppet valve 2; curve 23 shows the course of pressure in space 9; and curve 24 shows the course of pressure in the lower space 11. Curve 25 shows the course of pressure in the step area 12.

The diagram applies to a two-cycle engine. The function can also be applied analogously to a four-cycle engine. A part of the working stroke is used for the gas exchange in a two-cycle engine. The gas exchange takes place until the passing of the exhaust ports by the engine piston. Compression starts after the closing of the exhaust ports. In general, fuel injection starts. As soon as the solenoid valve 8 is opened, the pressures in the spaces 23 and 24 start to rise until the movement of the step pistons 6 begins, which is also reflected by the short-term increase in pressure in the step area 12 (curve 25). As soon as the passageway 15 is opened between the step area 12 and the lower space 11, the pressure in the step area 25 drops to the value of the pressure in the lower space 11. After closing of the solenoid valve 8, the pressures drop in the spaces 9 and 11 based on the out-flow through the poppet valve 2. The pressure in the step area 12 follows the pressure drop in a somewhat delayed manner. The pressure in the spaces 9 and 11 continues to drop during the entire course of the closing movement. Because of some small leakage of the solenoid valve 8, some gas continues to flow briefly so that the pressure in the spaces 9 and 11 slightly increase again after closing of the poppet valve 2.

Figure 3:
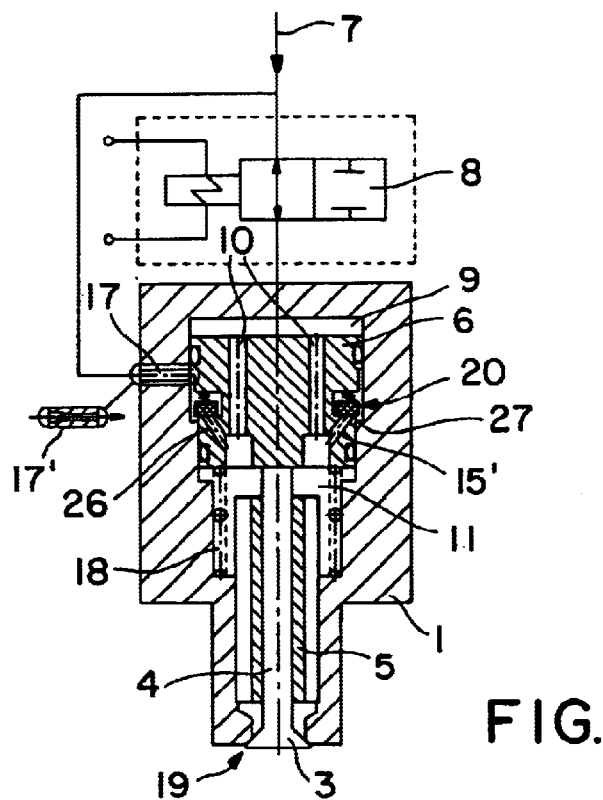
FIGS. 3, 4 and 5 show additional embodiments of the inventive valves in an illustration corresponding substantially to FIG. 1.

The embodiment illustrated in FIG. 3 deviates from the one in FIG. 1 in that the switching member is designed as a ring valve 20 for the passageway 15' between the step areas 12 on the step piston 6 and the space 11 between the step piston 6 and the valve head 3 whereby said ring valve 20 is arranged in the annular space defined by the step surface on the step piston 6, whereby said ring valve 20 is biased by a spring force against the end of the bores 26 in the step piston 6, and whereby said bores form the passageway 15' to space 11 between the step piston 6 and the valve head 3. Said ring valve 20 moves together with the step piston 6 and opens the passageway 15' when it abuts a stop member 27 of the housing 1 during its stroke movement (shown here as an encompassing shoulder piece).

Otherwise, in FIG. 3 there are identical or at least correspondingly functioning elements identified with the same reference numerals as in FIG. 1. The functioning description as well as the corresponding explanation in reference to FIG. 2 apply also unchanged to the explanation of FIG. 3.

Figure 4:
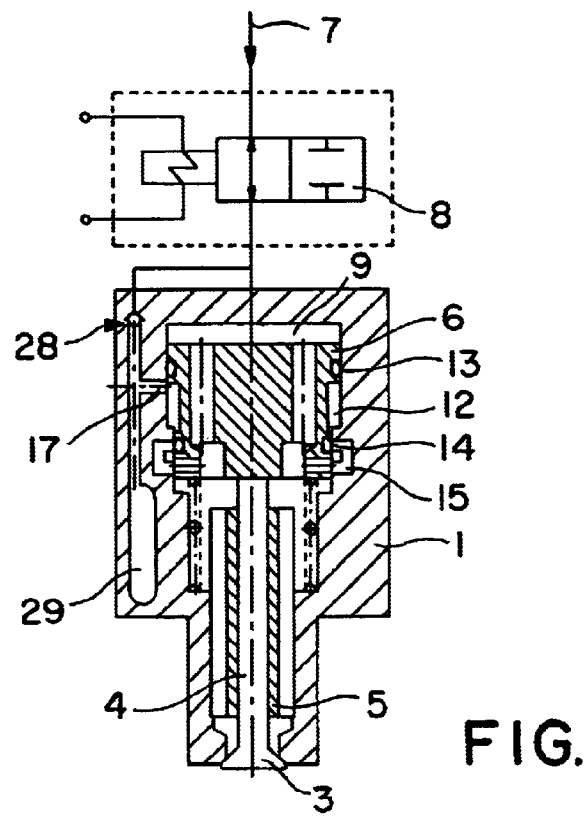
Figure 5:
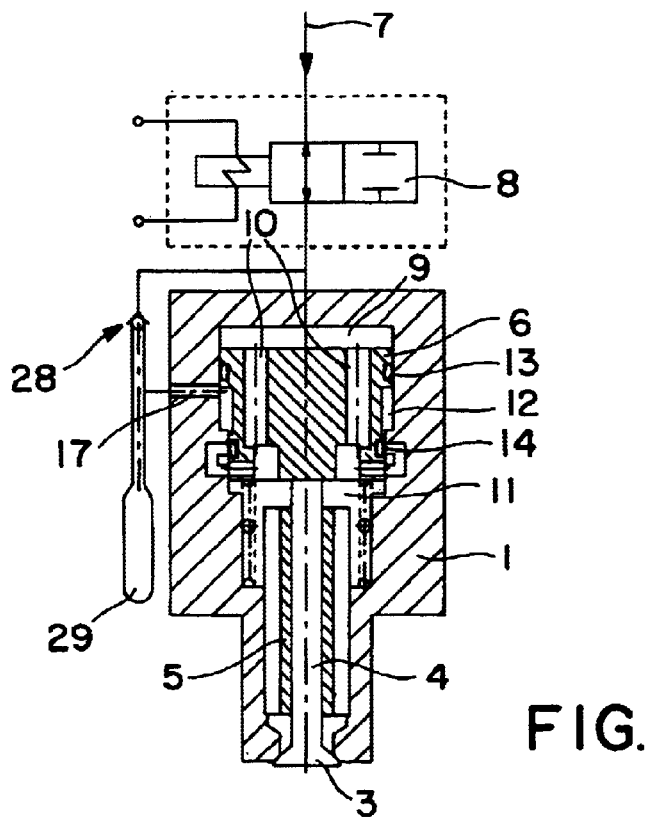

FIG. 4 and FIG. 5 show embodiments of inventive valves that correspond to the embodiment examples in FIG. 1 in their general construction. As a deviation from FIG. 1 there is proposed in both cases that the passageway 17 is not permanently connected to the delivery line 7, but that said passageway 17 is connected via a check valve 28 to the area between the solenoid valve 8 and the larger upper side of the step piston 6 (practically the upper space 9), which is constructively easier to realize in many cases, whereby said check valve 28 makes possible a free flow in the direction of the step area or the step space 12. The effective pressure to maintain the closing force in the step area 12 is thereby not diverted from the pressure of the delivery line 7 itself, but it is provided by the pressure back-up stored in the reservoir 29. This reservoir 29 is machined into the housing 1 of the valve according to FIG. 4—an external reservoir is 29 is provided in FIG. 5. The reservoir 29 is filled with the high pressure existing in the space 9 after opening the solenoid valve 8. The pressure drops in space 9 and the check valve 28 closes after closing the solenoid valve 8. As soon as the step piston opens the passageway 17 with the sealing member 13, pressurized gas flows from the reservoir 29 into the step area 12 and re-establishes the higher pressure serving as a reliable closing force.

We claim:

1. A valve assembly for controlling flow of pressurized gaseous fuel from a supply line to a combustion chamber of a gas engine, said valve assembly comprising:

a check valve which comprises a housing that defines a first end and a second end, said second end defining an opening for supplying pressurized gaseous fuel to said combustion chamber, said opening having an inner diameter; a moveable step piston located in said housing, said step piston defining a first portion facing said first end of said housing and a second portion facing said second end of said housing, said first portion having a larger diameter than said second portion so as to define an annular step area therebetween; a poppet which includes a stem which extends from said step piston to said second end of said housing and a head which can open and close said opening in said second end, an area defined between said stem and said inner diameter of said opening being less than an area of said annular step area; and a spring for biasing said step piston so as to move said poppet to close said opening, a solenoid valve connected to said supply line, a first delivery line for delivering pressurized gaseous fuel from said solenoid valve to a first space in said housing between said first end thereof and said step piston, and a second delivery line for delivering pressurized gaseous fuel from said solenoid valve to a second space in said housing between said second end thereof and said step piston, said housing defining an annular chamber around said annular step area of said step piston, a third delivery line for delivering pressurized gaseous fuel to said annular chamber, a passageway between said annular chamber and said second space, and a first and second switching member for selectively opening and closing said third delivery line and said passageway according to the movement of said step piston.

2. A valve assembly according to claim 1, wherein said first switching member comprises a first sealing member provided at the circumfernce of said first portion of said step piston and an opening of said third delivery line arranged in said housing being selectively opened and closed by said first sealing member.

3. A valve assembly according to claim 1, wherein said second switching member comprises a second sealing member provided at the circumference of said second portion of said step piston and an opening of said passageway arranged in said housing being selectively opened and closed by said second sealing member.

4. A valve assembly according to claim 1, wherein said second switching member comprises a ring valve positioned in said annular chamber and biased by spring force against one end of a bore in said step piston defining said passageway, said ring valve moving with said step piston and opening said passageway when abutting at a stop member fixed at said housing.

5. A valve assembly according to claim 1, wherein said third delivery line is permanently connected to said fuel supply line.

6. A valve assembly according to claim 1, wherein said third delivery line is connected to said first space in said housing via a check valve allowing flow only in the direction from said first space to said annular chamber.

* * * * *

UNITED STATES PATENT AND TRADEMARK OFFICE
CERTIFICATE OF CORRECTION

PATENT NO. : 6,726,172 B2
DATED : April 27, 2004
INVENTOR(S) : Haus F. Matthews et al.

It is certified that error appears in the above-identified patent and that said Letters Patent is hereby corrected as shown below:

<u>Title page</u>,
Item [73], should read:
-- [73] Assignee: Hoerbiger Kompressortechnik Services, GmbH, Vienna (AT) --

Signed and Sealed this

Thirteenth Day of July, 2004

JON W. DUDAS
*Acting Director of the United States Patent and Trademark Office*